United States Patent
Chen et al.

(10) Patent No.: US 12,322,119 B2
(45) Date of Patent: Jun. 3, 2025

(54) MOVEMENT DETECTION METHOD AND JOYSTICK DEVICE WHICH CAN SENSITIVELY DETECT ROTATION AND TRANSLATION

(71) Applicant: PixArt Imaging Inc., Hsin-Chu (TW)

(72) Inventors: Yi-Chung Chen, Hsin-Chu (TW); Chao-Chien Huang, Hsin-Chu (TW); Chung-Yuo Wu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 467 days.

(21) Appl. No.: 17/970,542

(22) Filed: Oct. 20, 2022

(65) Prior Publication Data

US 2024/0135553 A1 Apr. 25, 2024
US 2024/0233141 A9 Jul. 11, 2024

(51) Int. Cl.
*A63F 13/213* (2014.01)
*A63F 13/24* (2014.01)
*G05G 9/047* (2006.01)
*G06F 3/0338* (2013.01)
*G06T 7/246* (2017.01)

(52) U.S. Cl.
CPC ............ *G06T 7/248* (2017.01); *A63F 13/213* (2014.09); *A63F 13/24* (2014.09); *G06F 3/0338* (2013.01); *A63F 2300/1043* (2013.01); *A63F 2300/1087* (2013.01)

(58) Field of Classification Search
CPC ......... G06T 7/248; G06T 7/60; A63F 13/213; A63F 13/24; A63F 2300/1043; A63F 2300/1087; G06F 3/0338; G06F 3/0317; G05G 9/047
See application file for complete search history.

(56) References Cited

U.S. PATENT DOCUMENTS

| | | | |
|---|---|---|---|
| 6,172,665 B1 * | 1/2001 | Bullister | G06F 3/0312 345/163 |
| 7,002,549 B2 * | 2/2006 | McCahon | G06F 3/0317 345/158 |
| 2007/0126700 A1 * | 6/2007 | Wright | G06F 3/0321 345/161 |
| 2022/0043522 A1 * | 2/2022 | Shepelev | B60K 35/10 |

FOREIGN PATENT DOCUMENTS

CN    201910567938    * 12/2020

* cited by examiner

*Primary Examiner* — Siamak Harandi
(74) *Attorney, Agent, or Firm* — Winston Hsu

(57) ABSTRACT

A movement detection method, applied to a navigation input device with a navigation pattern comprising a center pattern and a radial pattern. The movement detection method comprises: (a) capturing a sensing image comprising a center pattern image and at least portion of a radial pattern image by an image sensor, wherein the center pattern image corresponds to the center pattern and the radial pattern image corresponding to the radial pattern; (b) computing a translation of the navigation input device according to shift of the center pattern image; and (c) computing a rotation angle of the navigation input device according to a first pattern relation between the center pattern image and a first portion of the radial pattern image. The translation and the rotation angle can be precisely and sensitively detected even if the joystick device is miniaturized, since the translation and the rotation angle are computed according to the navigation pattern.

25 Claims, 11 Drawing Sheets

MOVEMENT DETECTION METHOD AND JOYSTICK DEVICE WHICH CAN SENSITIVELY DETECT ROTATION AND TRANSLATION

BACKGROUND OF THE INVENTION

1. Field of the Invention

The present invention relates to a movement detection method and a joystick device, and particularly relates to a movement detection method and a joystick device which can sensitively detect rotation and translation of a control pillar.

2. Description of the Prior Art

With the popularization of game consoles and the diversification of functions, designs of a game controller become more and more important. Specifically, as the game console becomes thinner and lighter, the size of the game controller is also required to be reduced accordingly. However, if the game controller is miniaturized, the sensitivity of detecting joystick movement will also be limited.

SUMMARY OF THE INVENTION

One objective of the present invention is to provide a movement detection method which can sensitively detect the translation and the rotation of a navigation input device.

Another objective of the present invention is to provide a joystick device which can sensitively detect the translation and the rotation of a control pillar.

One embodiment of the present invention discloses a movement detection method, applied to a navigation input device with a navigation pattern comprising a center pattern and a radial pattern. The movement detection method comprises: (a) capturing a sensing image comprising a center pattern image and at least portion of a radial pattern image by an image sensor, wherein the center pattern image corresponds to the center pattern and the radial pattern image corresponding to the radial pattern; (b) computing a translation of the navigation input device according to shift of the center pattern image; and (c) computing a rotation angle of the navigation input device according to a first pattern relation between the center pattern image and a first portion of the radial pattern image.

Another embodiment of the of the present invention discloses a joystick device comprising a control pillar and an image sensor. The control pillar, comprises a navigation pattern with a center pattern and a radial pattern. The image sensor performs following steps: (a) capturing a sensing image comprising a center pattern image and at least portion of a radial pattern image by an image sensor, wherein the center pattern image corresponds to the center pattern and the radial pattern image corresponding to the radial pattern; (b) computing a translation of the navigation input device according to shift of the center pattern image; and (c) computing a rotation angle of the navigation input device according to a first pattern relation between the center pattern image and a first portion of the radial pattern image.

In view of above-mentioned embodiments, the translation and the rotation angle can be precisely and sensitively detected even if the joystick device is miniaturized, since the translation and the rotation angle are computed according to the navigation pattern.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. It will be appreciated that the system, the device, the apparatus or the module depicted in following embodiments can be implemented by hardware (ex. circuit) or the combination of hardware and software (ex. a processing unit executing at least one program). The term "first", "second", "third" in following descriptions are only for the purpose of distinguishing different one elements, and do not mean the sequence of the elements. For example, a first device and a second device only mean these devices can have the same structure but are different devices.

Further, in following embodiments, a joystick device of a game controller is taken as an example for explaining the concept of the present invention. However, the concept disclosed by the present invention can be applied to a navigation input device rather than limited to a joystick device. Besides, the navigation input device disclosed by the present invention can be applied to any other device rather than limited to a game controlled.

Figure 1:
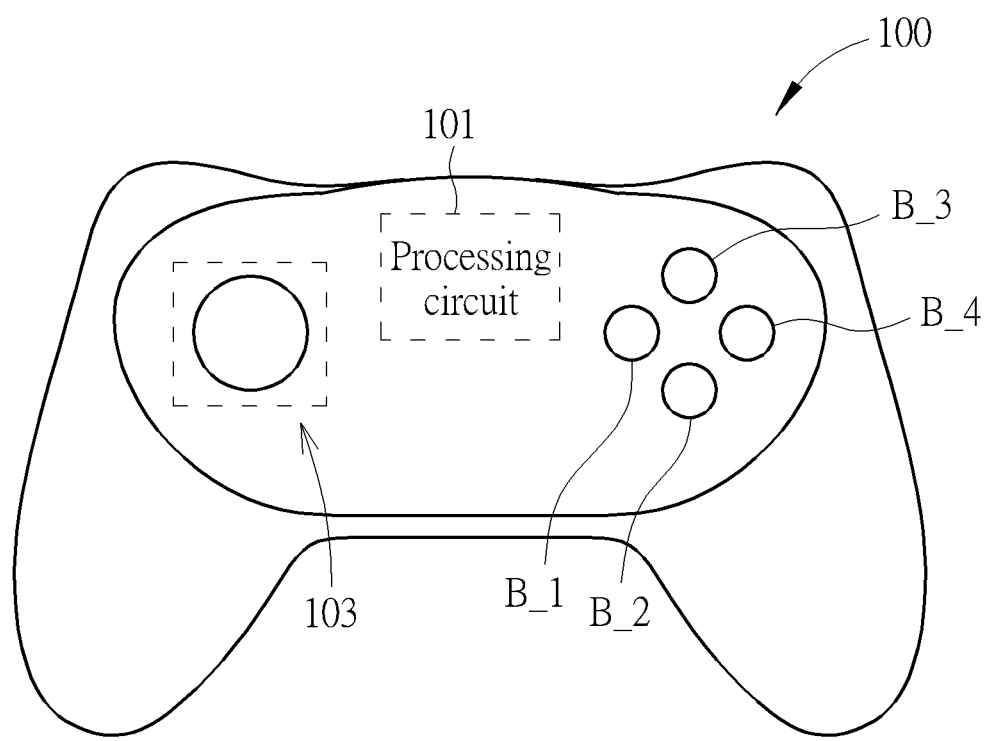
FIG. 1 is a schematic diagram illustrating a game controller according to one embodiment of the present invention.

FIG. 1 is a schematic illustrating a game controller 100 according to one embodiment of the present invention. As illustrated in FIG. 1, the game controller 100 comprises a processing circuit 101, a joy stick device 103, and buttons B_1, B_2, B_3, B_4. The game controller 100 in FIG. 1 is only for example, the game controller provided by the present invention is not limited to the embodiment illustrated in FIG. 1. The processing circuit 101 is configured to receive input signals from the joy stick device 103 and the buttons B_1, B_2, B_3, B_4, to generate control commands. The host which receives the control commands, such as a game console or a computer, can control the displayed objects (e.g., a game character or a cursor), according to the control commands.

Figure 2:
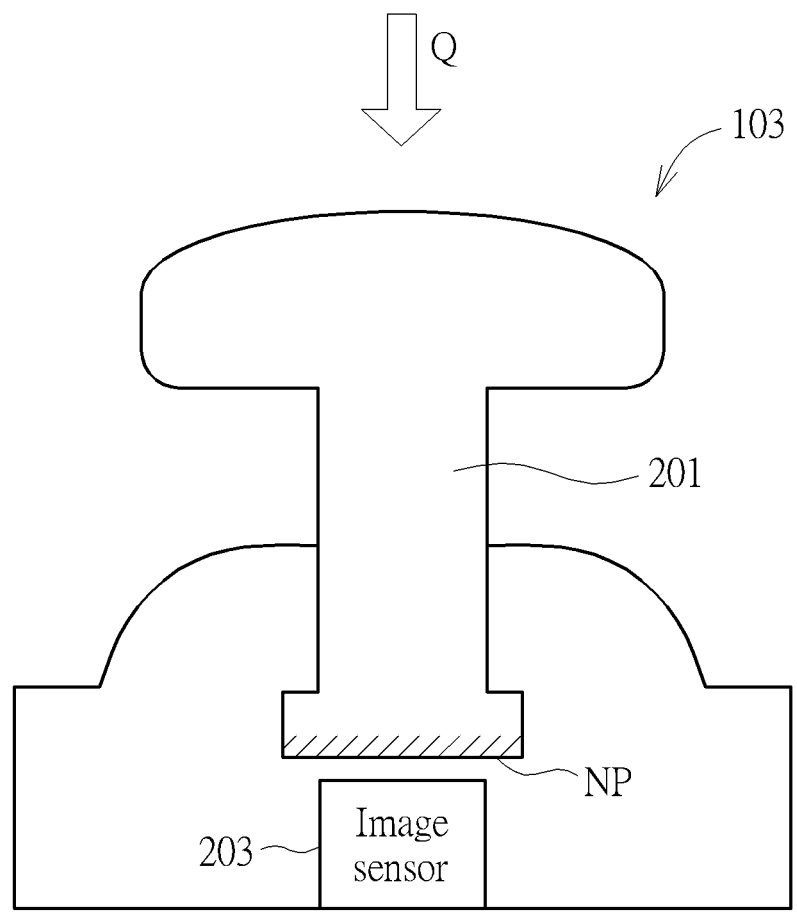
FIG. 2 is a schematic diagram illustrating a joystick device according to one embodiment of the present invention.

FIG. 2 is a schematic diagram illustrating the joy stick device 103 of the game controller 100 according to one embodiment of the present invention. As illustrated in FIG. 2, the joy stick device 103 comprises a control pillar 201 and an image sensor 203. Also, a navigation pattern NP is provided at a bottom of the control pillar 201, and an image sensor 203 is below the control pillar 201. Therefore, the image sensor 203 senses a pattern image of the navigation pattern NP. The pattern image has displacement if the control pillar 201 is tilted. Therefore, the image sensor 203 computes a translation and/or a rotation angle of the control pillar 201 according to the pattern image. Details of computing the translation and/or the rotation angle are described in following descriptions.

Figure 3:
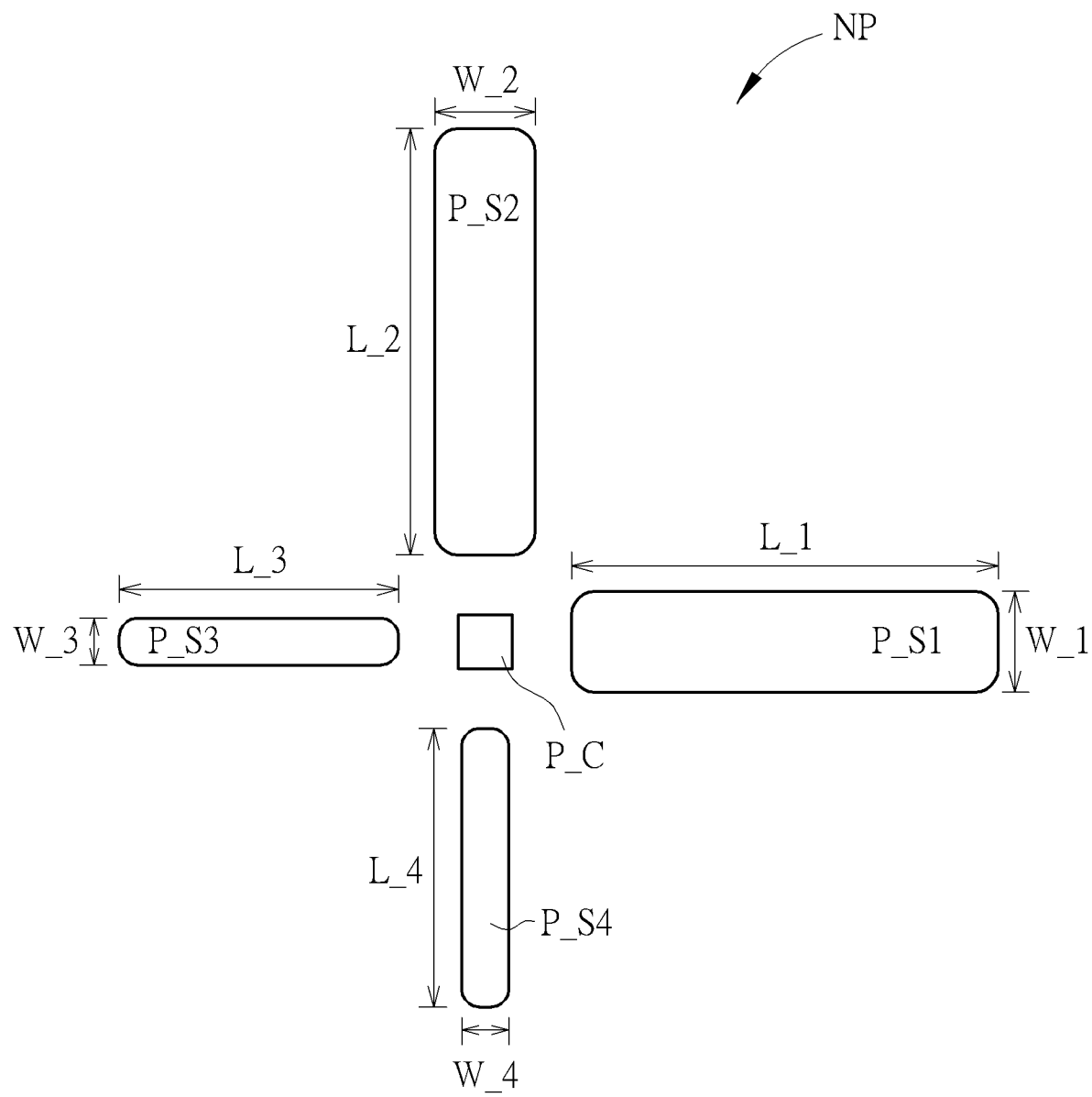
FIG. 3 is a schematic diagram illustrating a navigation pattern according to one embodiment of the present invention.

In one embodiment, the navigation pattern NP comprises a center pattern and a radial pattern. In one embodiment, the radial pattern comprises a plurality of sub patterns which have at least two different image features. The image features can be, for example, different shapes, different colors, or different brightness. FIG. 3 is a schematic diagram illustrating a navigation pattern NP according to one embodiment of the present invention. As illustrated in FIG. 3, the navigation pattern NP comprises a center pattern P_C and a radial pattern comprising a first sub pattern P_S1, a second sub pattern P_S2, a third sub pattern P_S3 and a fourth sub pattern P_S4. The first sub pattern P_S1 has a first length L_1 and a first width W_1. The second sub pattern P_S2 has a second length L_2 and a second width W_2. The third sub pattern P_S3 has a third length L_3 and a third width W_3. The fourth sub pattern P_S4 has a fourth length L_4 and a fourth width W_4. The first sub pattern P_S1, the second sub pattern P_S2, the third sub pattern P_S3 and the fourth sub pattern P_S4 are surrounding the center pattern P_C in a clock wise manner or in a counter clock wise manner.

Specifically, in the embodiment of FIG. 3, the first length L_1, the second length L_2 are larger than the third length L_3, the fourth length L_4. Also, the first width W_1 and the second width W_2 are larger than the third width W_3 and the fourth width W_4. Further, the first length L_1 and the second length L_2 are identical, the third length L_3 and the fourth length L_4 are identical, the first width W_1 and the second width W_2 are identical, the third width W_3 and the fourth width W_4 are identical. Additionally, the third sub pattern P_S3 and the first sub pattern P_S1 are at opposite sides of the center pattern P_C, the fourth sub pattern P_S4 and the second sub pattern P_S2 are at opposite sides of the center pattern P_C. Besides, the first sub pattern P_S1 and the second sub pattern P_S2 are perpendicular with each other. The third sub pattern P_S3 and the fourth sub pattern P_S4 are perpendicular with each other. Please note, the description "perpendicular with" here means the patterns do not touch but extension lines thereof are perpendicular with each other. However, the description "perpendicular with" can mean the patterns really touch and are perpendicular with each other.

As above-mentioned, the image sensor 203 computes a translation and/or a rotation angle of the control pillar 201 according to the pattern image. However, the computations of the translation and the rotation angle can be performed by a processing circuit independent from the image sensor 203, such as the processing circuit 101. If the computations of the translation and the rotation angle are performed by the image sensor 203, it can be regarded that the processing circuit is integrated into the image sensor 203.

FIG. 4, FIG. 5, FIG. 6, and FIG. 7 are schematic diagrams illustrating a movement detection method according to embodiments of the present invention. The movement detection method computes a translation and a rotation angle of the control pillar 201 according to the pattern image. In the embodiments of FIG. 4, FIG. 5, FIG. 6, and FIG. 7, the controller pillar 201 is also drawn. Please note, the drawings of the controller pillar 201 in FIG. 4, FIG. 5, FIG. 6, and FIG. 7 are the drawings viewed in the direction Q in FIG. 2.

Figure 4:
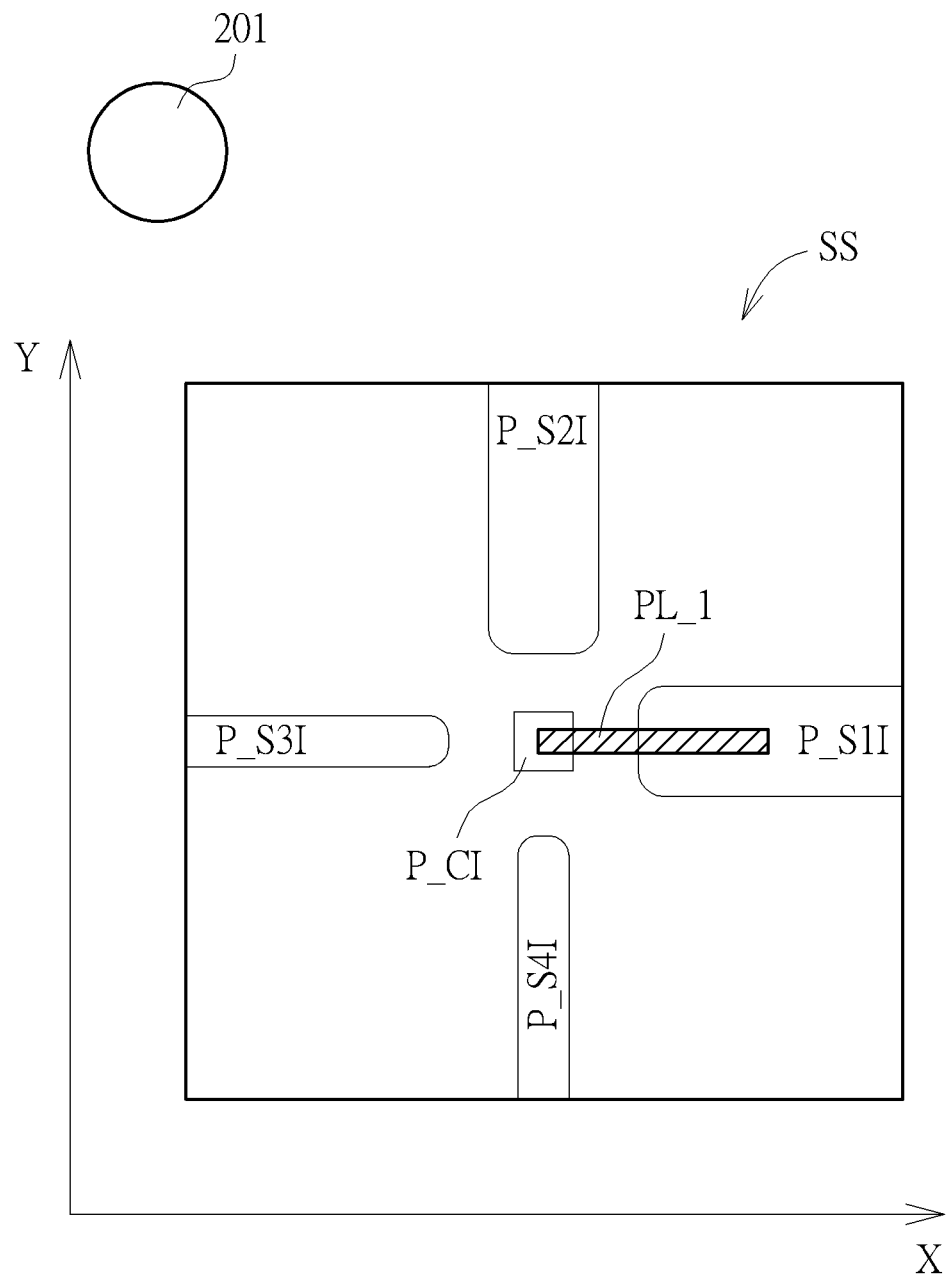
FIG. 4, FIG. 5, FIG. 6, FIG. 7, FIG. 8 and FIG. 9 are schematic diagrams illustrating a movement detection method according to embodiments of the present invention.

The sensing image SS in FIG. 4 comprises the center pattern image P_CI and comprises a radial pattern image including a first sub pattern image P_S1I, a second sub pattern image P_S2I, a third sub pattern image P_S3I and a fourth sub pattern image P_S4I. Also, in the embodiment of FIG. 4, the control pillar 201 is not moved, thus the center pattern image P_CI and the radial pattern image are at the initial position. Please note, in FIG. 4 the center pattern image P_CI is at a center position of the sensing image SS. However, the initial position of the center pattern image P_CI can be set at any required position. Also, the initial position of the center pattern image P_CI may change due to the deformation or the shift of the control pillar 201, or due to the shift of the image sensor 203, after the joystick device 103 has been used for a long time.

In one embodiment, a first pattern relation is defined when the control pillar 201 is not moved. However, the first pattern relation can also be defined while the control pillar 201 is moving. The first pattern relation is between the center pattern image P_CI and a first portion of the radial pattern image, such as the first pattern relation PL_1 shown in FIG. 4. Various methods can be applied to define the first pattern relation PL_1. For example, in one embodiment, the image sensor 203 defines a line between a centroid of the center pattern image P_CI and a centroid of the first sub pattern image P_S1I as the first pattern relation PL_1. In another example, the image sensor 203 defines the center pattern image P_CI and a portion of the first sub pattern image P_S1I as the first pattern relation PL_1.

The first sub pattern image can be selected corresponding to various requirements. In one embodiment, the first sub pattern image is a sub pattern image which is closest to the X axis or the Y axis. In another embodiment, the first sub pattern image is a sub pattern image which has a largest size or a longest length. In still another embodiment, the first sub pattern image is a thick sub pattern image which is adjacent to a thin sub pattern in a clockwise direction or in a counter clockwise direction.

Figure 5:
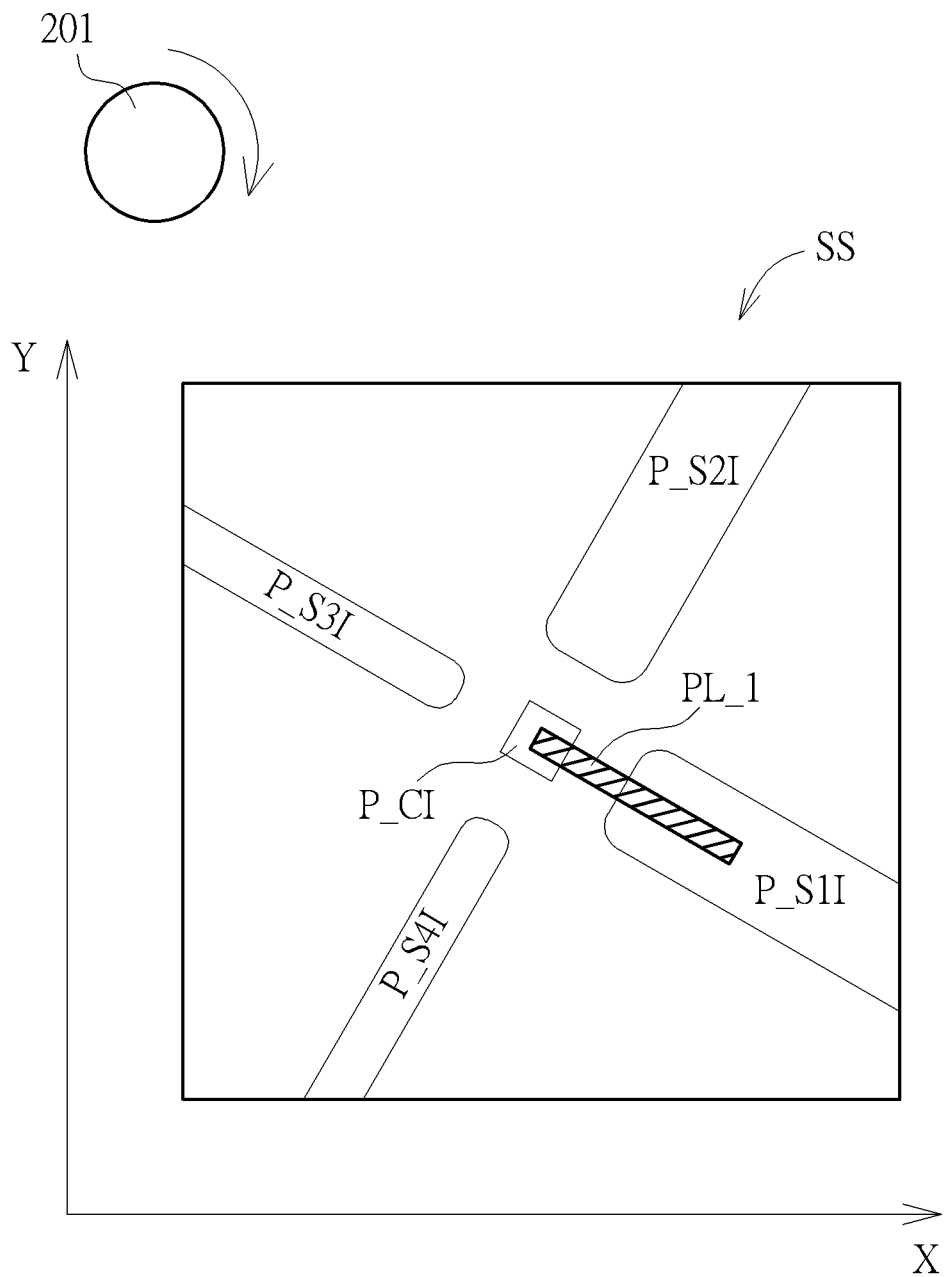

After the first pattern relation PL_1 is defined, the image sensor 203 computes a rotation angle of the control pillar 201 according to the first pattern relation PL_1. In one embodiment, the image sensor 203 computes a rotation angle of the control pillar 201 according to a rotation angle of the first pattern relation PL_1. In the embodiment of FIG. 5, the control pillar 103 rotates in a clockwise manner, thus the first pattern relation PL_1 also rotates in the counter clockwise manner. Thereby, the image sensor 203 can compute the rotation angle of the control pillar 201 according to the rotation angle of the first pattern relation PL_1 between FIG. 4 and FIG. 5.

In one embodiment, the sensing image SS has an X axis and a Y axis, as shown in FIG. 4 and FIG. 5. In such embodiment, the image sensor 203 computes the rotation angle of the control pillar 201 according to an angle between the first pattern relation PL_1 and the X axis, or according to an angle between the first pattern relation OL_1 and the Y axis. For example, in FIG. 4, an angle between the first pattern relation PL_1 and the X axis is 0°. Also, in FIG. 5, an angle between the first pattern relation PL_1 and the X axis is −30° (or 30° in a clockwise manner). Therefore, the image sensor 201 can compute that the rotation angle of the control pillar 201 between FIG. 4 and FIG. 5 is −30° (or 30° in a clockwise manner). The angles 0° and −30° here can be regarded as absolute angles. Also, the rotation angle −30° for the first pattern relation PL_1 between FIG. 4 and FIG. 5 can be regarded as a relative angle.

However, as above-mentioned, the initial locations of the center pattern image P_CI and the first pattern image P_S1I nay be changed due to various reasons. Therefore, the initial absolute angle may also be changed. For example, in one embodiment, the initial angle between the first pattern relation PL_1 and the X axis is 10° rather than 0° shown in FIG. 4. Then, the image sensor 201 detects that an angle between the first pattern relation PL_1 and the X axis is −30°, as shown in FIG. 5. After that, the image sensor 201 can compute that the rotation angle of the first pattern relation PL_1 is 40°. In such case, the absolute angles are 10° and −30°, and the rotation angle (the relative angle) is 40°.

Figure 6:
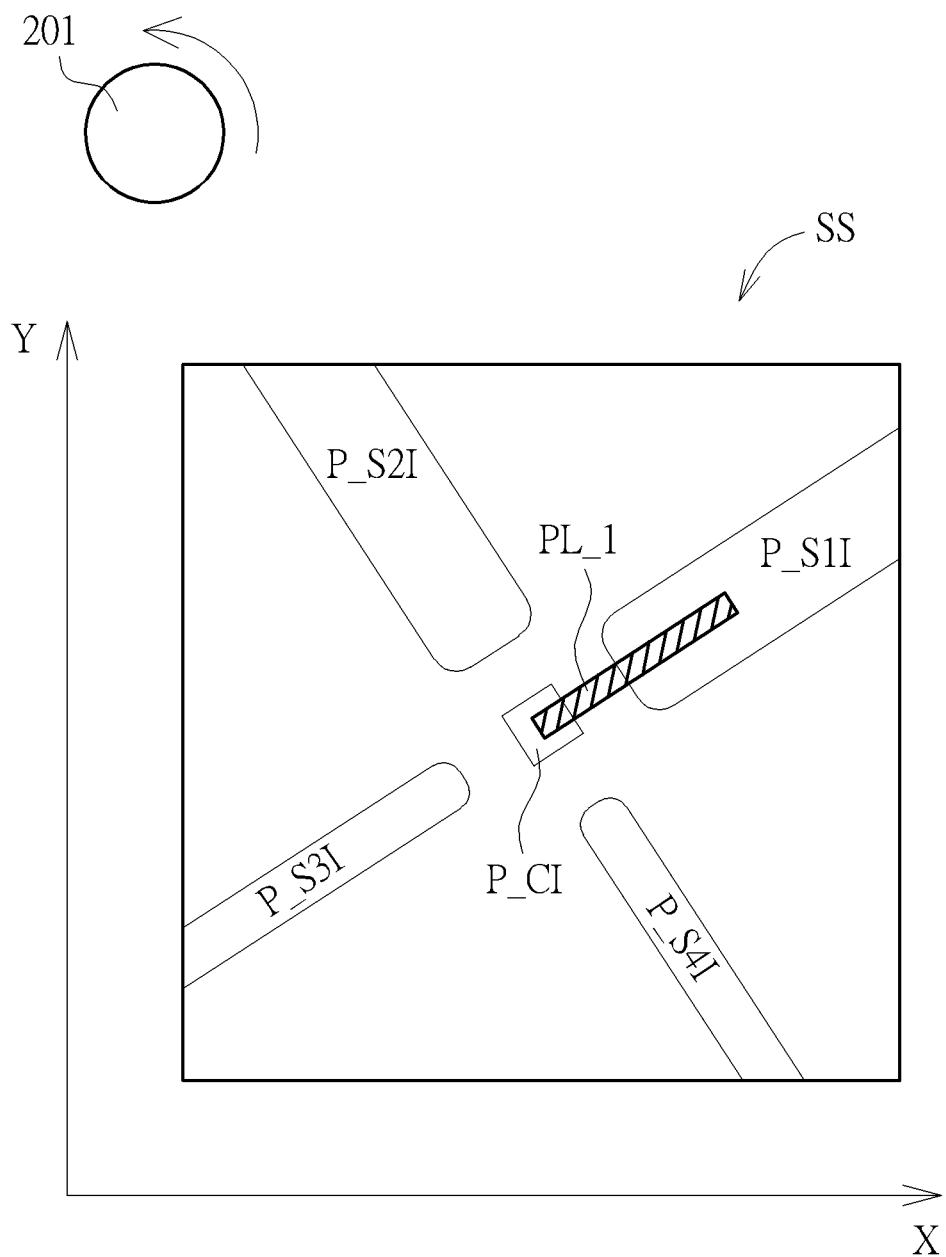

Following the same rule, in the embodiment of FIG. 6, an angle between the first pattern relation PL_1 and the X axis is 30° (or 30° in a counter clockwise manner). Therefore, the image sensor 201 can compute that the rotation angle of the control pillar 201 between FIG. 4 and FIG. 6 is 30° (or 30° in a counter clockwise manner). The angle 0° and 30° are above-mentioned absolute angles. Also, the rotation angle 30° for the first pattern relation PL_1 between FIG. 4 and FIG. 6 is the above mentioned relative angle.

In another embodiment, the initial angle between the first pattern relation PL_1 and the X axis is 10° rather than 0° in FIG. 4. Then, the image sensor 201 detects that an angle between the first pattern relation PL_1 and the X axis is 30°, as shown in FIG. 6. After that, the image sensor 201 can compute that the rotation angle of the first pattern relation PL_1 is 20°. In such case, the absolute angles are 10° and 30°, and the rotation angle (the relative angle) is 20°.

Figure 7:
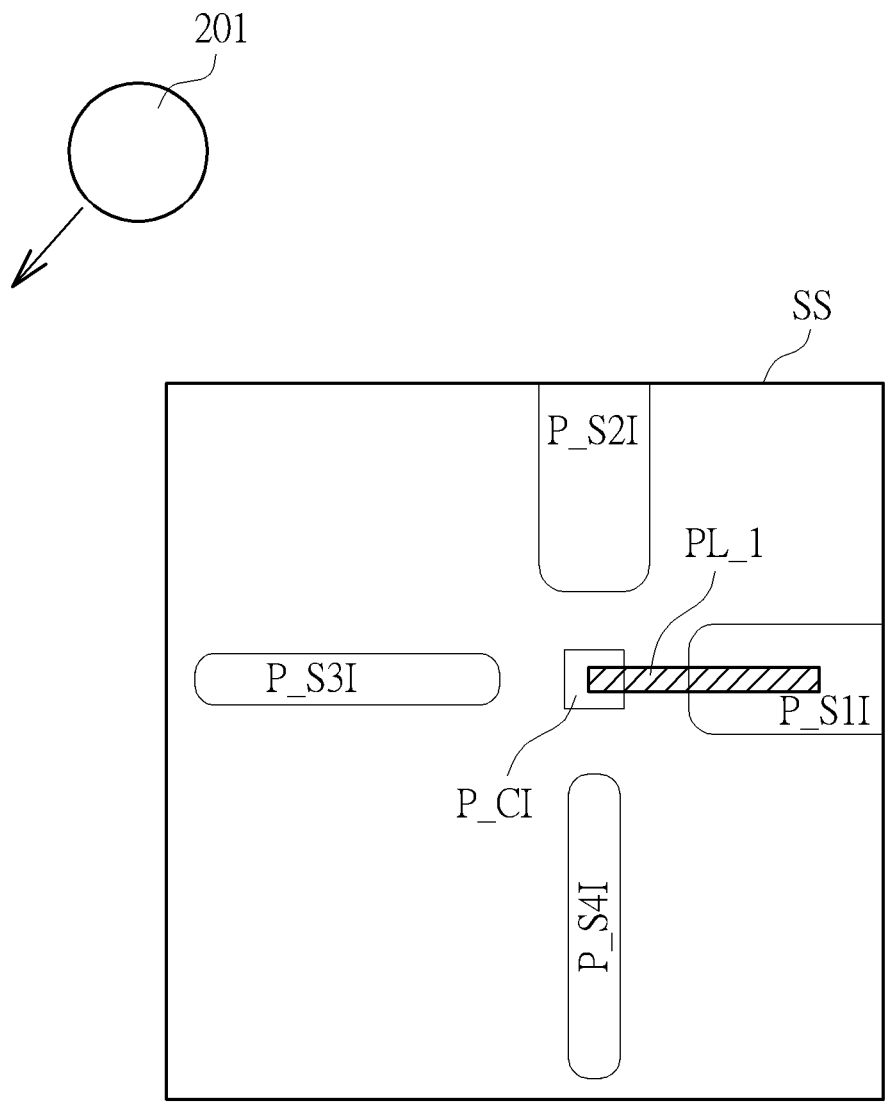

Further, as above-mentioned, the image sensor 203 can compute a translation of the control pillar 201 according to shift of the center pattern image P_CI. In the embodiment of FIG. 7, the control pillar 201 is moved down left, thus the center pattern image P_CI and the radial pattern image moves in an opposite direction, that is, moves up right. Thereby, the image sensor 203 can compute a translation of the control pillar 201 according to shift (or named the displacement) of the center pattern image P_CI. It will be appreciated that the moving direction of the control pillar 201 and the center pattern image P_CI may be the same in some embodiments, depending on the structure of the joy-stick device.

As above-mentioned the initial location of the center pattern image may shift due to various reasons. In such case, the image sensor 203 computes the displacement of the center pattern image P_CI according to the shifted initial location of the center pattern image and a location of the center pattern image which is detected later.

A ratio between the moving distance of the center pattern image P_CI and the moving distance of the control pillar 201 may be 1, or may be a value besides 1. For example, in one embodiment, the ratio is 1, thus the image sensor 203 determines that the moving distance of the center pattern image P_CI is M nm if the displacement of the first pattern relation PL_1 is M nm. In another embodiment, the ratio is 1.2, thus the image sensor 203 determines the moving distance of the center pattern image P_CI is 1.2 M nm if the displacement of the first pattern relation PL_1 is M nm. The ratio can be set corresponding to different requirements, for example, corresponding to design requirements.

Figure 8:
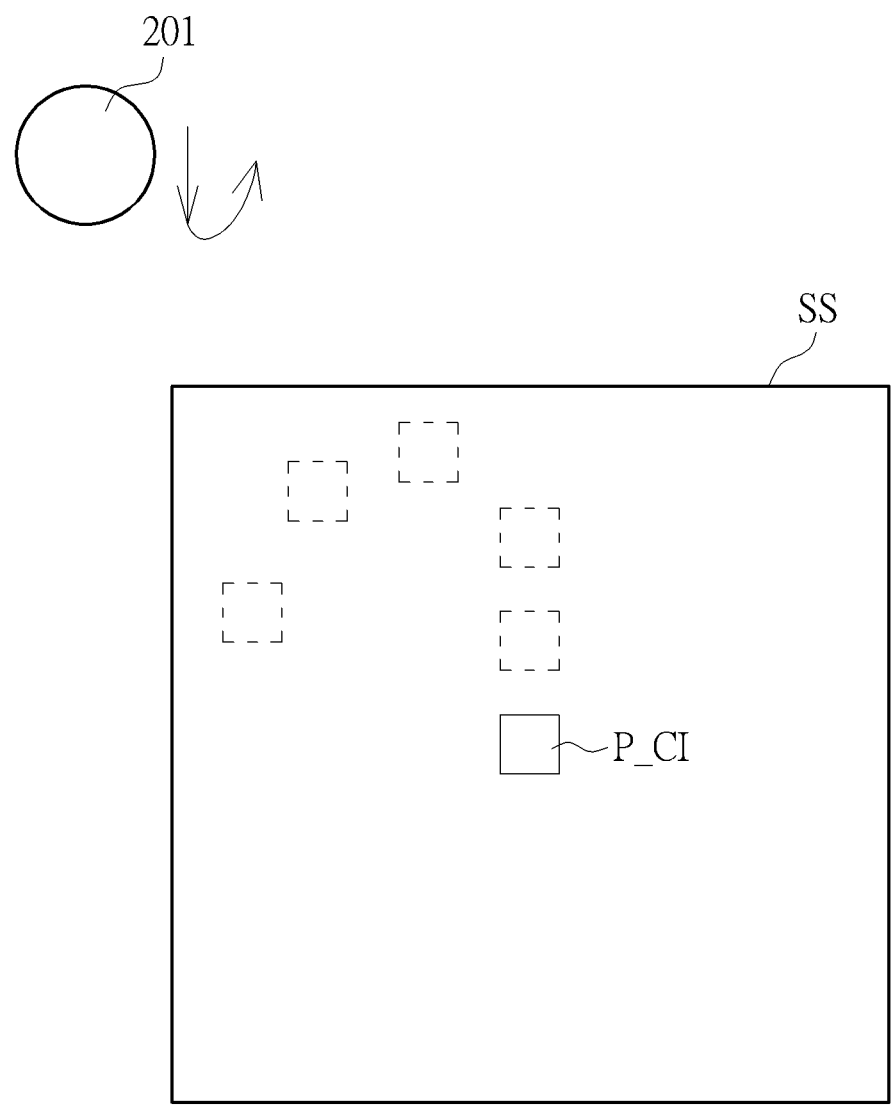

The translation of the control pillar 201 is not limited to be determined by only two locations of the center pattern image P_CI. The translation of the control pillar 201 can be determined by more than two locations of the center pattern image P_CI. As shown in FIG. 8, the control pillar 201 moves down and moves to form a ¼ round. The center pattern image P_CI moves in an opposite way, as shown by the dotted lines illustrated in FIG. 8. In such case, the translation of the control pillar 201 is determined by a plurality of locations of the center pattern image P_CI in a predetermined time, rather than determined by a first location and a last location of the center pattern image P_CI.

Figure 9:
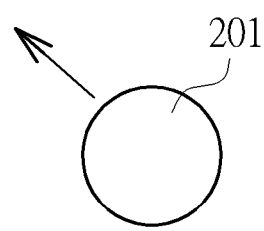
Figure 9:
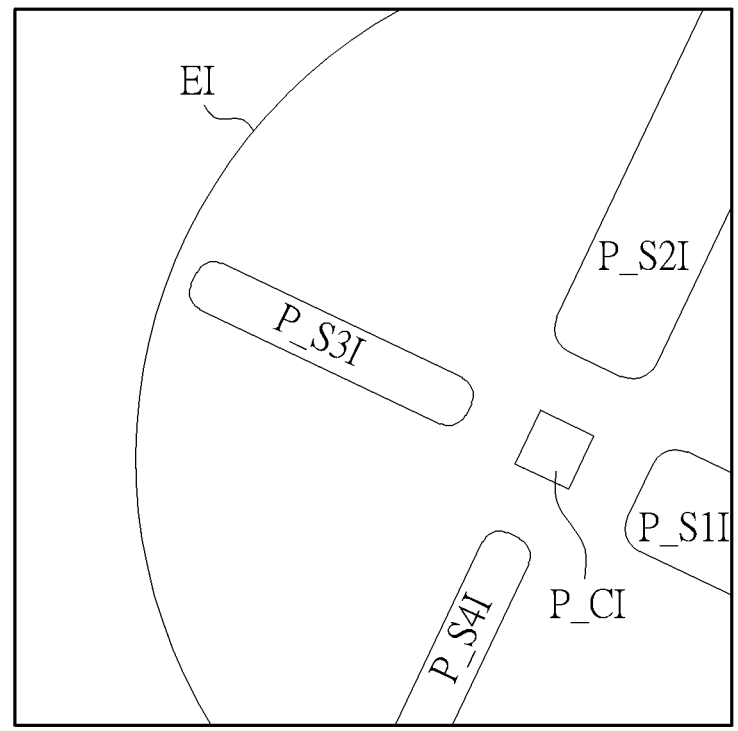

In one embodiment, the translation of the control pillar 201 is large such that an edge of the bottom of the control pillar 201 is sensed by the image sensor 203 but only a small portion or none of the first sub pattern P_S1 is sensed. As shown in FIG. 9, the sensing image SS comprises the edge image EI corresponding to the edge of the control pillar 201's bottom, but only of a small portion of the first sub pattern P_S1I is comprised in the sensing image SS. In such case, the defined first pattern relation PL_1 could not be found since too few of the first sub pattern P_S1 is sensed.

In such case, the image sensor 203 applies other portions of the radial pattern to compute the rotation angle. Specifically, the image sensor 203 computes the rotation angle of the control pillar 201 according to a second pattern relation between the center pattern image P_CI and a second portion of the radial pattern image, or according to a third pattern relation between the center pattern image P_CI and a third portion of the radial pattern image. The radial patterns which have the second portion and the third portion are two sub pattern images which are closest to the first pattern relation PL_1.

For example, in the embodiment of FIG. 9, the image sensor 203 defines a second pattern relation between the center pattern image P_CI and the second sub pattern image P_S2, and defines a third pattern relation between the center pattern image P_CI and the fourth sub pattern image P_S4. Next, the image sensor 203 calculates the first pattern relation PL_1 according to the second pattern relation and the third pattern relation. After that, the rotation angle can be computed according to the calculated first pattern relation P_L1.

Please note, the first pattern relation P_L1 can be computed according to only one of the second pattern relation and the third pattern relation. In one embodiment, one of the second pattern relation and the third pattern relation is selected to compute the first pattern relation P_L1 according to sizes of corresponding sub pattern images. For example, the second pattern relation is selected since the second sub pattern image P_S2 has a largest size, or the third pattern relation is selected since the fourth sub pattern image P_S4 has a longest length.

Further, in above-mentioned embodiments, the rotation directions of the sensing image SS and the control pillar 201 are identical, and the translation directions of the sensing image SS and the control pillar 201 are opposite. However, the relations of the rotation directions and the relations of the translation directions are not limited to such examples. The relations may change due to various factors, such as the design, the location of the image sensor 203, or the following processing procedure of the sensing image SS. For example, in one embodiment, the rotation directions of the sensing image SS and the control pillar 201 are identical, and the translation directions of the sensing image SS and the control pillar 201 are also identical, due to the design of the image sensor 203.

Figure 10:
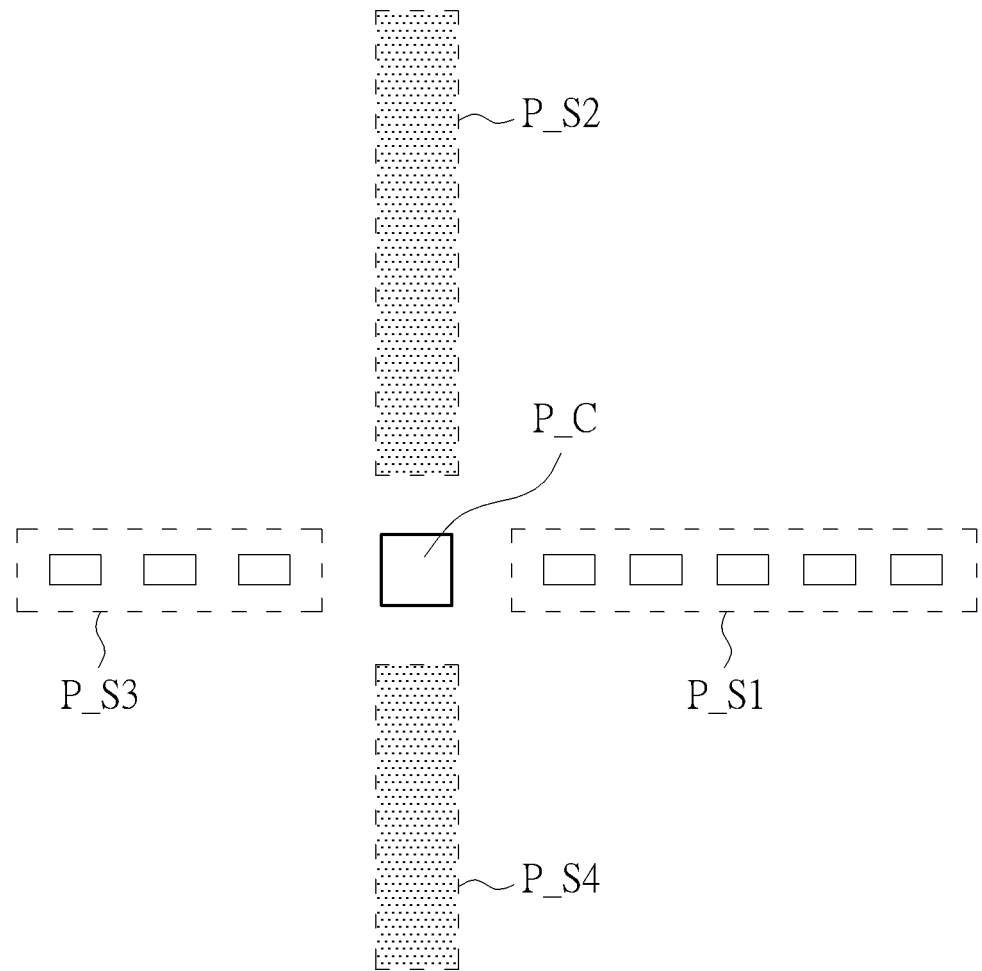
FIG. 10 is a schematic diagram illustrating a navigation pattern according to another embodiment of the present invention.

Shapes or arrangements of the center pattern P_C and the radial pattern are not limited to above-mentioned embodiments. In one embodiment, at least one of the first sub pattern P_S1, the second sub pattern P_S2, the third sub pattern P_S3 and the fourth sub pattern P_S4 is formed by independent dots or independent segments. FIG. 10 is a schematic diagram illustrating a navigation pattern according to another embodiment of the present invention. As shown in FIG. 10, the first sub pattern P_S1 and the third sub pattern P_S3 are formed by independent segments. Also, the second sub pattern P_S2 and the fourth sub pattern P_S4 are formed by independent dots.

After the translation or the rotation angle is acquired, the image sensor 203 outputs the translation or the rotation angle to the processing circuit 101 in FIG. 1. Next, the processing circuit 101 generates a control command according to the translation or the rotation angle.

Figure 11:
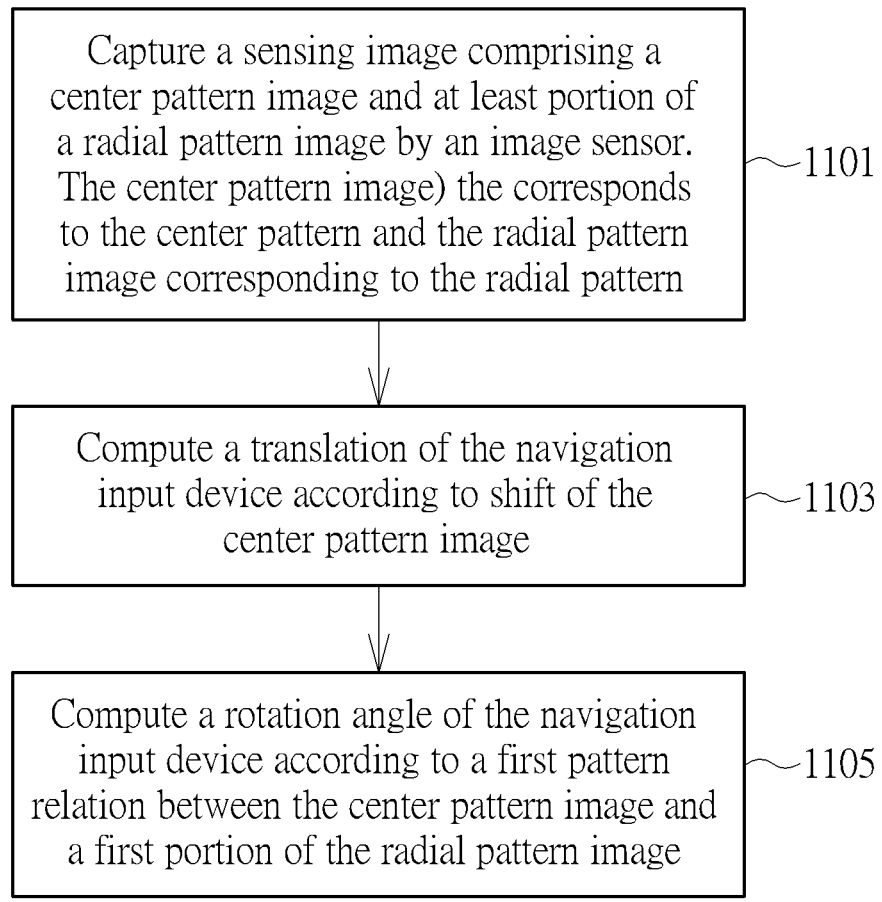
FIG. 11 is a flow chart illustrating a movement detection method according to one embodiment of the present invention.

In view of above-mentioned embodiments, a movement detection method can be acquired. FIG. 11 is a flowchart illustrating a movement detection method according to one embodiment of the present invention. The movement detection method is applied to a navigation input device (e.g., the joystick device 103) with a navigation pattern comprising a center pattern and a radial pattern. The movement detection method comprises:

Step 1101

Capture a sensing image (e.g., sensing image SS) comprising a center pattern image and at least portion of a radial pattern image by an image sensor (e.g., the image sensor 203). The center pattern image (e.g., center pattern image P_CI) corresponds to the center pattern and the radial pattern image (e.g., the sub pattern images in FIG. 4, FIG. 5, FIG. 6, FIG. 7 and FIG. 8) corresponds to the radial pattern.

Step 1103

Compute a translation of the navigation input device according to shift of the center pattern image (e.g., the embodiments illustrated in FIG. 7 and FIG. 8).

Step 1105

Compute a rotation angle of the navigation input device according to a first pattern relation (e.g., first pattern relation PL_1 illustrated in FIG. 4, FIG. 5 and FIG. 6) between the center pattern image and a first portion of the radial pattern image.

Please note, the sequence of the steps 1103, 1105 can be swapped. Also, the steps 1103, 1105 can be performed simultaneously but can be performed at different time as well. Other detail steps are illustrated in above-mentioned embodiments, thus are omitted for brevity here.

In view of above-mentioned embodiments, the translation and the rotation angle can be precisely and sensitively detected even if the joystick device is miniaturized, since the translation and the rotation angle are computed according to the navigation pattern.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A movement detection method, applied to a navigation input device with a navigation pattern comprising a center pattern and a radial pattern, the movement detection method comprising:
   (a) capturing a sensing image comprising a center pattern image and at least portion of a radial pattern image by an image sensor, wherein the center pattern image corresponds to the center pattern and the radial pattern image corresponds to the radial pattern;
   (b) computing a translation of the navigation input device according to shift of the center pattern image; and
   (c) computing a rotation angle of the navigation input device according to a first pattern relation between the center pattern image and a first portion of the radial pattern image.

2. The movement detection method of claim 1, wherein the step (c) computes the rotation angle according to an angle between the first pattern relation and an X axis of the sensing image, or according to an angle between the first pattern relation and a Y axis of the sensing image.

3. The movement detection method of claim 1,
   wherein the radial pattern comprises at least two sub patterns;
   wherein the step (c) further computes the rotation angle of the navigation input device according to a second pattern relation between the center pattern image and a second portion of the radial pattern image or according to a third pattern relation between the center pattern image and a third portion of the radial pattern;
   wherein the radial pattern image which have the second portion and the third portion are two of the sub pattern images which are closest to the first pattern relation.

4. The movement detection method of claim 1, wherein the radial pattern comprises a plurality of sub patterns which have at least two different image features.

5. The movement detection method of claim 4, wherein the sub patterns have at least two different shapes.

6. The movement detection method of claim 4, wherein the sub patterns comprise:
   a first sub pattern, having a first length and a first width;
   a second sub pattern, having a second length and a second width;
   a third sub pattern, having a third length and a third width;
   a forth sub pattern, having a fourth length and a fourth width;
   wherein the first sub pattern, the second sub pattern, the third sub pattern and the fourth sub pattern are surrounding the center pattern in a clock wise manner or in a counter clock wise manner.

7. The movement detection method of claim 6, wherein at least one of the first sub pattern, the second sub pattern, the third sub pattern and the fourth sub pattern is formed by independent dots or independent segments.

8. The movement detection method of claim 6, wherein the first length, the second length are larger than the third length, the fourth length.

9. The movement detection method of claim 8, wherein the first width, the second width are larger than the third width, the fourth width.

10. The movement detection method of claim 9, wherein the first length and the second length are identical, the third length and the fourth length are identical, the first width and the second width are identical, the third width and the fourth width are identical.

11. The movement detection method of claim 6,
    wherein the first pattern relation is formed by the center image and a portion of a first sub pattern image corresponding to the first sub pattern;
    wherein the third sub pattern and the first sub pattern are at opposite sides of the center pattern;
    wherein the fourth sub pattern and the second sub pattern are at opposite sides of the center pattern.

12. The movement detection method of claim 11,
    wherein the first sub pattern and the second sub pattern are perpendicular with each other;
    wherein the third sub pattern and the fourth sub pattern are perpendicular with each other.

13. The movement detection method of claim 1, wherein the navigation input device is a joystick device comprising a control pillar, and the navigation pattern is located on a bottom of the control pillar.

14. A joystick device, comprising:
   a control pillar, comprising a navigation pattern with a center pattern and a radial pattern; and
   an image sensor, configured to perform following steps:
   (a) capturing a sensing image comprising a center pattern image and at least portion of a radial pattern image by an image sensor, wherein the center pattern image corresponds to the center pattern and the radial pattern image corresponds to the radial pattern;
   (b) computing a translation of the navigation input device according to shift of the center pattern image; and
   (c) computing a rotation angle of the navigation input device according to a first pattern relation between the center pattern image and a first portion of the radial pattern image.

15. The joystick device of claim 14, wherein the step (c) computes the rotation angle according to an angle between the first pattern relation and an X axis of the sensing image, or according to an angle between the first pattern relation and a Y axis of the sensing image.

16. The joystick device of claim 14,
   wherein the radial pattern comprises at least two sub patterns;
   wherein the step (c) further computes the rotation angle of the navigation input device according to a second pattern relation between the center pattern image and a second portion of the radial pattern image or according to a third pattern relation between the center pattern image and a third portion of the radial pattern;
   wherein the radial pattern image which have the second portion and the third portion are two of the sub pattern images which are closest to the first pattern relation.

17. The joystick device of claim 14, wherein the radial pattern comprises a plurality of sub patterns which have at least two different image features.

18. The joystick device of claim 17, wherein the sub patterns have at least two different shapes.

19. The joystick device of claim 17, wherein the sub patterns comprise:
   a first sub pattern, having a first length and a first width;
   a second sub pattern, having a second length and a second width;
   a third sub pattern, having a third length and a third width;
   a forth sub pattern, having a fourth length and a fourth width;
   wherein the first sub pattern, the second sub pattern, the third sub pattern and the fourth sub pattern are surrounding the center pattern in a clock wise manner or in a counter clock wise manner.

20. The joystick device of claim 19, wherein at least one of the first sub pattern, the second sub pattern, the third sub pattern and the fourth sub pattern is formed by independent dots or independent segments.

21. The joystick device of claim 19, wherein the first length, the second length are larger than the third length, the fourth length.

22. The joystick device of claim 21, wherein the first width, the second width are larger than the third width, the fourth width.

23. The joystick device of claim 22, wherein the first length and the second length are identical, the third length and the fourth length are identical, the first width and the second width are identical, the third width and the fourth width are identical.

24. The joystick device of claim 19,
   wherein the first pattern relation is formed by the center image and a portion of a first sub pattern image corresponding to the first sub pattern;
   wherein the third sub pattern and the first sub pattern are at opposite sides of the center pattern;
   wherein the fourth sub pattern and the second sub pattern are at opposite sides of the center pattern.

25. The joystick device of claim 24,
   wherein the first sub pattern and the second sub pattern are perpendicular with each other;
   wherein the third sub pattern and the fourth sub pattern are perpendicular with each other.

* * * * *